United States Patent
Zwiener

(10) Patent No.: US 11,794,779 B2
(45) Date of Patent: Oct. 24, 2023

(54) PULLOVER MANEUVERS FOR AUTONOMOUS VEHICLES

(71) Applicant: Waymo LLC, Mountain View, CA (US)

(72) Inventor: Jakob Robert Zwiener, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 154 days.

(21) Appl. No.: 17/206,621

(22) Filed: Mar. 19, 2021

(65) Prior Publication Data
US 2022/0297725 A1    Sep. 22, 2022

(51) Int. Cl.
*B60W 30/14* (2006.01)
*B60W 30/18* (2012.01)
*B60W 40/105* (2012.01)
*G06V 20/56* (2022.01)
*B60W 60/00* (2020.01)

(52) U.S. Cl.
CPC ...... *B60W 60/0013* (2020.02); *B60W 30/146* (2013.01); *B60W 30/181* (2013.01); *B60W 30/18163* (2013.01); *B60W 40/105* (2013.01); *G06V 20/588* (2022.01); *B60W 2520/04* (2013.01); *B60W 2552/53* (2020.02)

(58) Field of Classification Search
CPC .......... B60W 60/0013; B60W 30/146; B60W 30/181; B60W 30/18163; B60W 40/105; B60W 2520/04; B60W 2552/53; G06V 20/588
See application file for complete search history.

(56) References Cited

U.S. PATENT DOCUMENTS

| | | | | |
|---|---|---|---|---|
| 9,523,984 B1 * | 12/2016 | Herbach | ............... | B60W 10/18 |
| 10,262,538 B1 * | 4/2019 | Milovich | ............... | H04W 4/44 |
| 10,394,234 B2 | 8/2019 | Ramezani et al. | | |

(Continued)

FOREIGN PATENT DOCUMENTS

| | | | | |
|---|---|---|---|---|
| CA | 3068898 A1 * | 1/2019 | ............ | B60K 31/00 |
| CN | 108431549 A * | 8/2018 | ............ | B60W 30/08 |

(Continued)

OTHER PUBLICATIONS

CN-112356825-A translation (Year: 2021).*
CN-108431549-A translation (Year: 2018).*

*Primary Examiner* — Jeff A Burke
*Assistant Examiner* — Kyle T Johnson
(74) *Attorney, Agent, or Firm* — Botus Churchill IP Law LLP

(57) ABSTRACT

Aspects of the disclosure relate to conducting pullover maneuvers for autonomous vehicles. For instance, a pullover location may be identified. A pullover start location may be determined for the pullover location. A first distance for the vehicle to come to a complete stop within a pullover deceleration limit may be determined based on a current speed of the vehicle. A second distance between a current location of the vehicle and the pullover start location may be determined. The first distance may be compared to the second distance to assess feasibility of the pullover location. The vehicle may be controlled in order to conduct a pullover maneuver in an autonomous driving mode.

21 Claims, 11 Drawing Sheets

(56) References Cited

U.S. PATENT DOCUMENTS

| | | | |
|---|---|---|---|
| 10,394,243 B1* | 8/2019 | Ramezani | G05D 1/0214 |
| 10,467,581 B2* | 11/2019 | Laury | G01C 21/343 |
| 2013/0289874 A1* | 10/2013 | Taguchi | G01C 21/34 |
| | | | 701/400 |
| 2014/0088849 A1* | 3/2014 | Ham | G06F 17/00 |
| | | | 701/70 |
| 2018/0338229 A1* | 11/2018 | Nemec | B60W 30/181 |
| 2019/0235499 A1* | 8/2019 | Kazemi | G01S 17/931 |
| 2020/0307632 A1* | 10/2020 | Tsuji | B60W 60/0059 |
| 2020/0377077 A1* | 12/2020 | Nessler | B60Q 5/005 |
| 2021/0041870 A1 | 2/2021 | Dyer et al. | |
| 2021/0094575 A1* | 4/2021 | Sato | B60W 10/20 |
| 2021/0291868 A1* | 9/2021 | Okuda | B60W 30/09 |
| 2022/0153260 A1* | 5/2022 | Hamada | G06V 20/588 |
| 2022/0297725 A1* | 9/2022 | Zwiener | B60W 30/18163 |

FOREIGN PATENT DOCUMENTS

| | | | | |
|---|---|---|---|---|
| CN | 112356825 A * | 2/2021 | | B60W 30/06 |
| WO | WO-2019040420 A1 * | 2/2019 | | B60W 30/14 |

\* cited by examiner

PULLOVER MANEUVERS FOR AUTONOMOUS VEHICLES

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. When approaching the location or at any point during a trip, an autonomous vehicle may continuously look for pullover locations to stop the vehicle. These locations may be used, for example, for emergencies and/or to pick up and/or drop off passengers and/or goods for example, for a transportation service. Typically, autonomous vehicles may rely on looking for pullover locations that are at least some distance away from the vehicle (to avoid excessively fast lateral shifting and potential hard braking) when the vehicle is within some distance of a destination. However, such approaches do not take into account vehicle dynamics and may unnecessarily restrict where the vehicle can actually pull over.

BRIEF SUMMARY

Aspects of the disclosure provide a method of conducting pullover maneuvers for autonomous vehicles. The method includes identifying, by one or more processors, a pullover location; determining, by the one or more processors, a pullover start location for the pullover location; determining, by the one or more processors, a first distance for a vehicle to come to a complete stop within a pullover deceleration limit based on a current speed of the vehicle; determining, by the one or more processors, a second distance between a current location of the vehicle and the pullover start location; comparing, by the one or more processors, the first distance to the second distance to assess feasibility of the pullover location; and based on the comparison, controlling, by the one or more processors, the vehicle in an autonomous driving mode in order to conduct a pullover maneuver.

In one example, the pullover start location is determined based on a pullover offset distance between an edge of a current lane of the vehicle and an edge of the pullover location. In this example, as the pullover offset distance increases, a distance between the pullover start location and the pullover location increases. In another example, the first distance is determined further based on a current deceleration of the vehicle. In another example, the first distance is determined further based on a current rate of deceleration of the vehicle. In another example, the pullover deceleration limit is a predetermined limit on deceleration of the vehicle. In another example, when the first distance is greater than the second distance, controlling the vehicle includes controlling the vehicle to pullover into a second pullover location different from the pullover location. In another example, when the first distance is less than the second distance, controlling the vehicle includes selecting the pullover location as a pullover location for the vehicle. In this example, selecting the pullover location includes setting the pullover location as a destination for the vehicle. In addition or alternatively, the method also includes, after selecting the pullover location, continuing to identify pullover locations and assess feasibility of those pullover locations. In addition or alternatively, the method also includes, after selecting the pullover location: controlling the vehicle beyond the pullover start location towards the selected pullover location; and after controlling the vehicle beyond the pullover start location: identifying a second pullover location, determining a third distance for the vehicle to come to a complete stop based on an updated current location of the vehicle, an updated current speed of the vehicle, and the pullover deceleration limit, determining a fourth distance between the updated current location of the vehicle and the second pullover location, comparing the third distance to the fourth distance to assess feasibility of the second pullover location, and controlling the vehicle based on the comparison of the third distance to the second distance. In this example, when the third distance is less than the fourth distance, controlling the vehicle based on the comparison of the third distance to the second distance includes controlling the vehicle to the second pullover location. In addition, controlling the vehicle to the second pullover location effectively aborts the pullover maneuver. In alternatively, when the third distance is greater than the fourth distance, controlling the vehicle based on the comparison of the third distance to the second distance includes controlling the vehicle to the selected pullover location. In addition or alternatively, the second pullover location is closer to the updated current location of the vehicle than the selected pullover location.

Another aspect of the disclosure provides a system for conducting pullover maneuvers for autonomous vehicles. The system includes one or more processors configured to: identify a pullover location; determine a pullover start location for the pullover location; determine a first distance for a vehicle to come to a complete stop within a pullover deceleration limit based on a current speed of the vehicle; determine a second distance between a current location of the vehicle and the pullover start location; compare the first distance to the second distance to assess feasibility of the pullover location; and based on the comparison, control the vehicle in an autonomous driving mode in order to conduct a pullover maneuver.

In this example, the one or more processors are further configured to determine the pullover start location further based on a pullover offset distance between an edge of a current lane of the vehicle and an edge of the pullover location. In another example, the one or more processors are further configured to determine the first distance further based on a current deceleration of the vehicle. In another example, the one or more processors are further configured to, when the first distance is greater than the second distance, control the vehicle by controlling the vehicle to pullover into a second pullover location different from the pullover location. In another example, the one or more processors are further configured to, when the first distance is less than the second distance, control the vehicle by selecting the pullover location as a pullover location for the vehicle.

DETAILED DESCRIPTION

Overview

Figure 1:
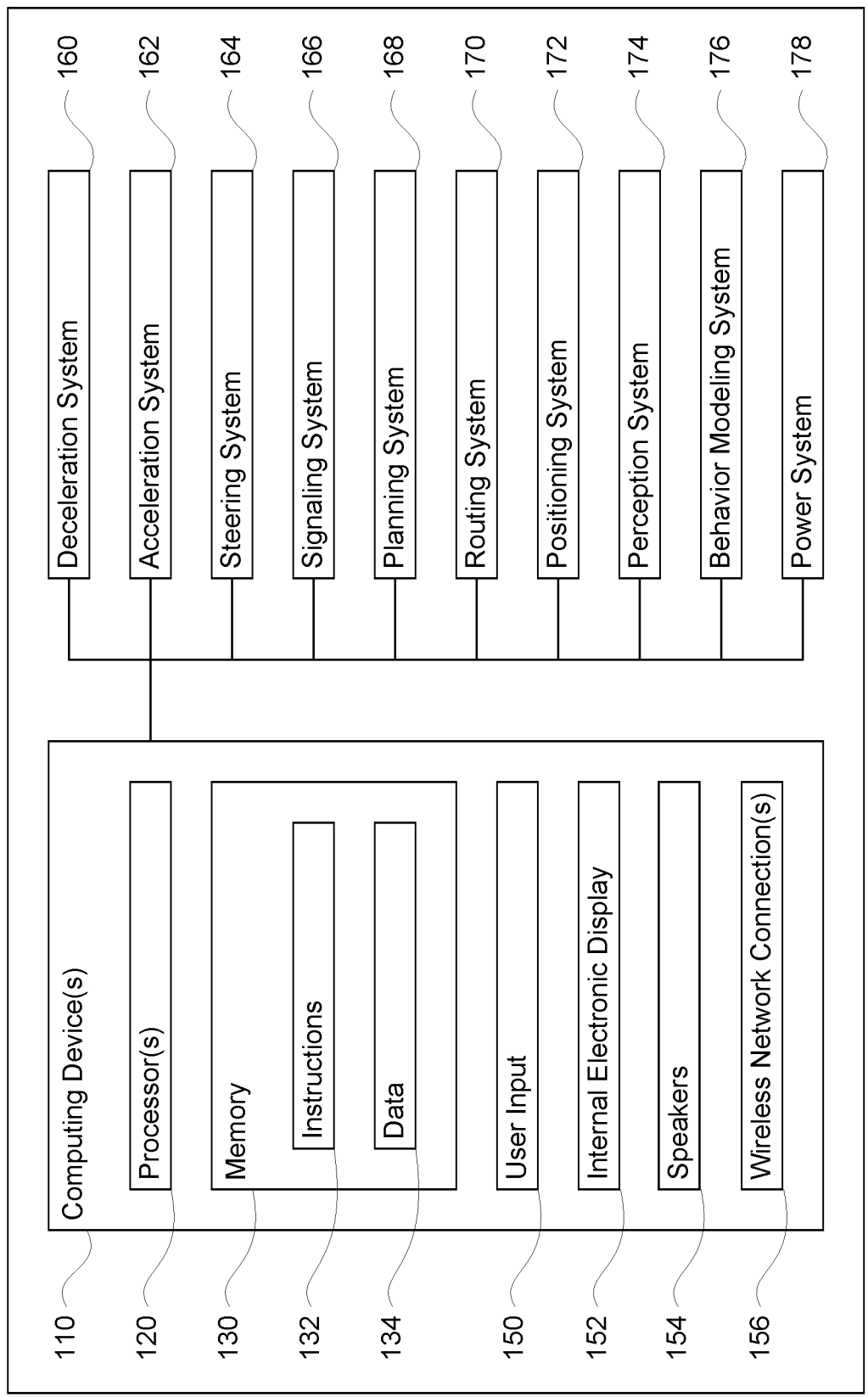
FIG. 1 is a functional diagram of an example vehicle in accordance with an exemplary embodiment.

The technology relates to pullover maneuvers for autonomous vehicles. For instance, the vehicle's systems may continuously look for pullover locations to stop the vehicle. These locations may be used, for example, for emergencies and/or to pick up and/or drop off passengers and/or goods. Typically, autonomous vehicles may rely on looking for pullover locations that are at least some distance away from the vehicle (to avoid excessively fast lateral shifting and potential hard braking of the vehicle) when the vehicle is within some distance of a destination. However, such approaches do not take into account vehicle dynamics and may unnecessarily restrict where the vehicle can actually pull over. To address this, rather than limiting pullover locations based on distance, they can instead be limited based on deceleration feasibility. Moreover, because these deceleration limits can be fixed in advance, they can be selected in order to ensure that passengers and tertiary persons (other vehicles, pedestrians, bicyclists, etc.), are not made uncomfortable.

Deceleration limits are typically used to determine whether certain trajectories are feasible for an autonomous vehicle. For example, when determining trajectories the vehicle's planner system may identify a plurality of objects in the vehicle's environment and may generate a corresponding set of constraints for each of these objects. The planner system may then attempt to generate a trajectory that avoids the constraints (e.g. does not hit or come too close to any of the identified objects) while at the same time does not exceed the deceleration limit. In some instances, if the planner system is unable to generate a trajectory, the deceleration limit may be adjusted.

However, when pulling over, rather than adjusting the deceleration limit for the purposes of the pullover, the vehicle's computing devices may simply identify another pullover location. The vehicle's computing devices may utilize an appropriate pullover deceleration limit or discomfort to choose a pullover location further away that the vehicle can reach more comfortably for any passenger or tertiary persons. In this regard, the vehicle's computing devices may utilize a pullover deceleration limit which may be different from the deceleration limit for nominal driving.

As the vehicle approaches a destination, it may begin to evaluate pullover locations. In many cases, pullover locations may be known in advance. For each pullover location identified (and not otherwise occupied), it may be evaluated for example, which location has the lowest cost. In addition, for each pullover location, the vehicle's computing devices may determine a pullover start location at which the vehicle will need to begin to adjust its lateral position in the road in order to pull into the pullover location. The location may be determined based on the difference between the lateral offsets in the vehicle's current location and the lateral offset in the planned pullover location. In other words, the lateral offset may correspond to how far to the left or right the vehicle would need to adjust itself from its current location to the pullover location.

The vehicle's computing devices may then determine whether a pullover location is feasible based on the vehicle dynamics, the pullover start location, and the pullover deceleration limit. For example, using the vehicle's current speed, deceleration, and rate of deceleration and various other factors as discussed further below, the vehicle's computing devices may estimate a first distance required for the vehicle to come to a complete stop within the pullover deceleration limit. The vehicle's computing devices may then compare this distance with a second distance between the vehicle's current location and the pullover start location to determine whether the pullover location is feasible.

The vehicle's computing devices may constantly continue looking for the "best" pullover location. This may continue, for example, until some point after the vehicle reaches a pullover start location of a selected pullover location and begins to laterally shift towards the selected pullover location. In this regard, the vehicle's computing devices may still have time to abort a pullover before the vehicle begins to laterally shift towards the selected pullover location.

As such, the vehicle's computing devices will continue to assess whether the selected pullover location is feasible and/or any other nearby pullover location is a better option by identifying pullover locations and evaluating them as described above.

The features described herein may allow for selection of pullover locations which prioritize the comfort of passengers as well as tertiary persons. In addition, in most driving situations, vehicle dynamics are determined based on real world objects, in other words, to avoid a collision with an object, a vehicle may brake as hard as necessary. However, because it is undesirable to perform uncomfortable maneuvers solely for the purpose of pulling over (assuming no other constraints) and because the vehicle's computing devices are able to simply select another pullover location, the features described herein may enable the vehicle to limit discomfort of passengers as well as tertiary persons.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the vehicle 100 or others as needed. For example, electronic display 152 may be located within a cabin of vehicle 100 and may be used by computing devices 110 to provide information to any passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the vehicle 100 and may be capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of vehicle 100 in accordance with the instructions 134 of memory 130 in the autonomous driving mode.

As an example, the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use the signaling system 166 in order to signal the vehicle's intent to other drivers or vehicles, for example, by lighting turn signals or brake lights when needed.

Routing system 170 may be used by the computing devices 110 in order to generate a route to a destination using map information. Planning system 168 may be used by computing device 110 in order to generate short-term trajectories that allow the vehicle to follow routes generated by the routing system. In this regard, the planning system 168 and/or routing system 166 may store detailed map information, e.g., highly detailed maps identifying a road network including the shape and elevation of roadways, lane lines, intersections, crosswalks, speed limits, traffic signals, buildings (including types or categories, footprints, number of stories, floors, levels, etc.), signs, real time traffic information (updated as received from a remote computing device, as such as the computing devices 410 discussed below or other computing devices), pullover spots, vegetation, or other such objects and information.

Figure 2A:
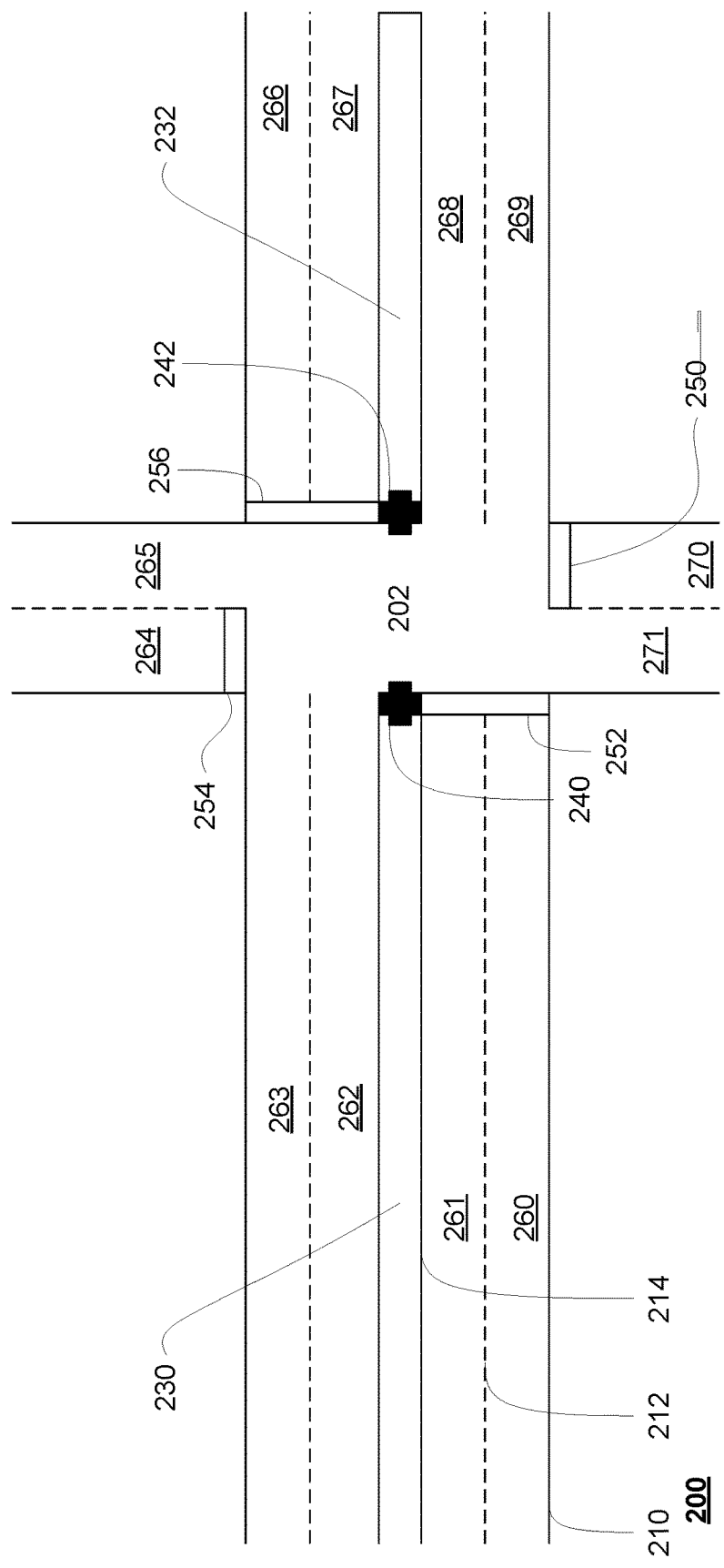
FIGS. 2A and 2B are an example of map information in accordance with aspects of the disclosure.
Figure 2B:
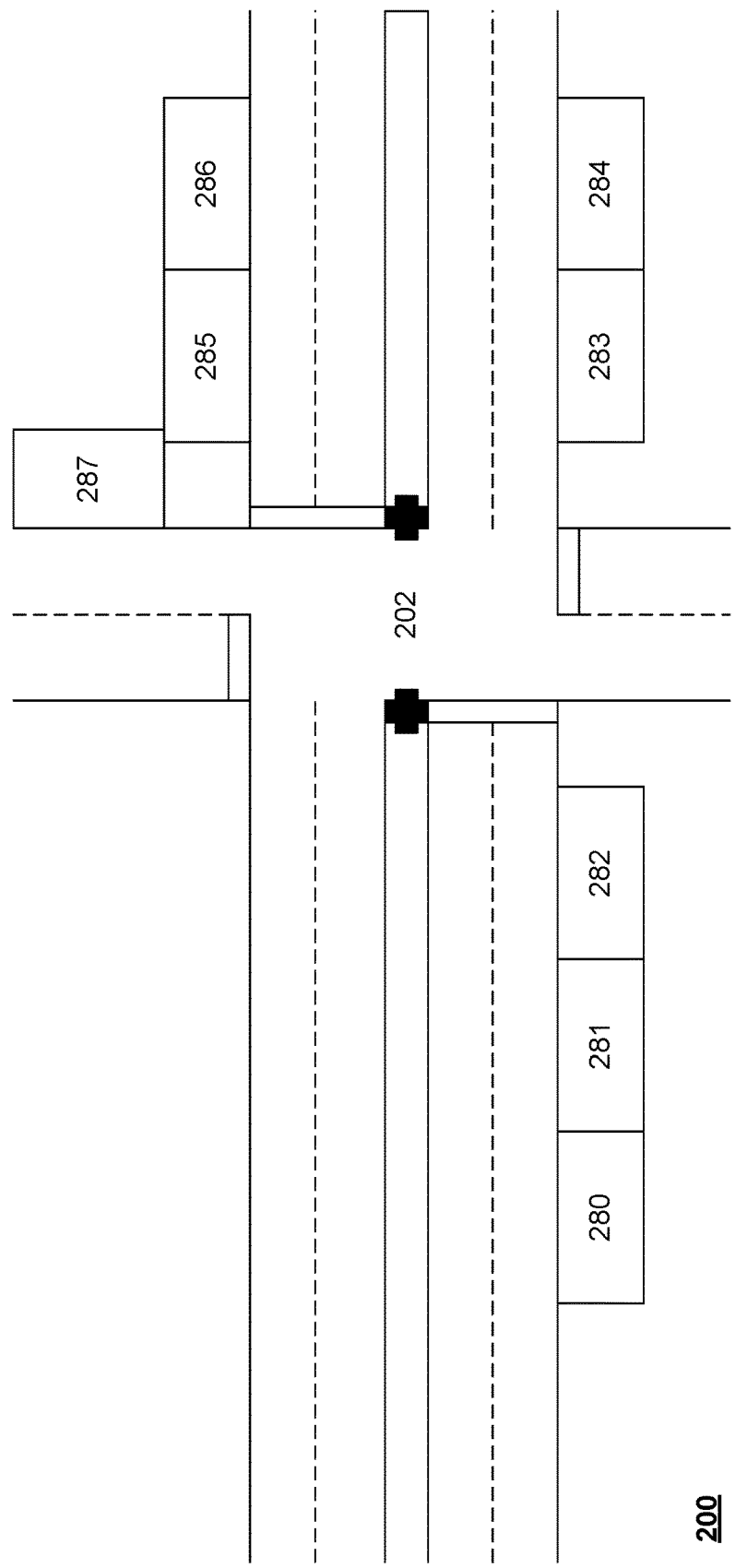

FIGS. 2A and 2B are an example of map information 200 for a section of roadway including intersection 202. FIG. 2A depicts a portion of the map information that includes information identifying the shape, location, and other characteristics of lane markers or lane lines 210, 212, 214, median areas 230, 232, traffic signals 240, 242, as well as stop lines 250, 252, 254, 256. The lane lines may also define various lanes 260-271 or these lanes may also be explicitly identified in the map information 200. In addition to these features, the map information may also include information that identifies the direction of traffic and speed limits for each lane as well as information that allows the computing devices 110 to determine whether the vehicle has the right of way to complete a particular maneuver (i.e. complete a turn or cross a lane of traffic or intersection), as well as other features such as curbs, buildings, waterways, vegetation, signs, etc.

The map information 200 may identify pullover locations which may include areas where a vehicle is able to stop and way to pick up a drop off passengers. These areas may correspond to parking spaces, waiting areas, shoulders, parking lots, etc. For instance, FIG. 2B depicts parking spaces 280-287. For simplicity, these pullover locations may correspond to parking spaces such as the aforementioned parking spaces, but may correspond to any type of area in which a vehicle is able to stop and way to pick up a drop off passengers.

Although the map information is depicted herein as an image-based map, the map information need not be entirely image based (for example, raster). For instance, the map information may include one or more roadgraphs, graph networks or road networks of information such as roads, lanes, intersections, and the connections between these features which may be represented by road segments. Each feature in the map may also be stored as graph data and may be associated with information such as a geographic location and whether or not it is linked to other related features, for example, a stop sign may be linked to a road and an intersection, etc. In some examples, the associated data may include grid-based indices of a road network to allow for efficient lookup of certain road network features.

In this regard, in addition to the aforementioned physical feature information, the map information may include a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes.

The routing system 166 may use the roadgraph to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 172 may also include other devices in communication with the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other vehicles, obstacles in the roadway, traffic signals, signs, trees, etc. For example, the perception system 174 may include lasers, sonar, radar, cameras and/or any other detection devices that record and generate sensor data which may be processed by the computing devices of the vehicle such as the computing devices 110. In the case where the vehicle is a passenger vehicle such as a minivan, the minivan may include a laser or other sensors mounted on the roof or other convenient location.

Figure 3:
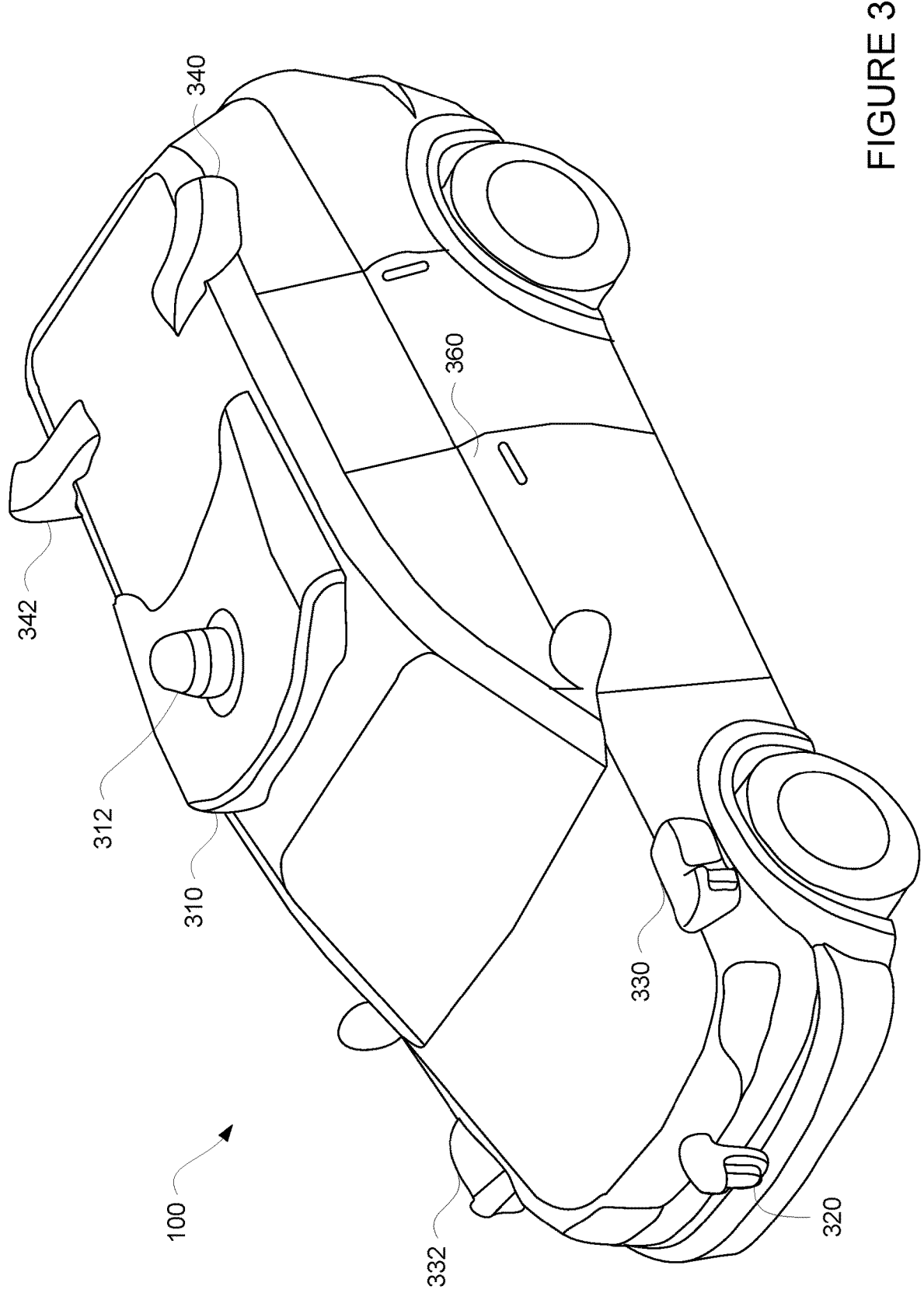
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior modeling system 176 which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168.

The planning system 168 may use this input to generate trajectories for the vehicle to follow for some brief period of time into the future based on a route generated by a routing module of the routing system 170. In this regard, the trajectories may define the specific characteristics of acceleration, deceleration, speed, etc. to allow the vehicle to follow the route towards reaching a destination. The trajectory may include a geometry component and a speed component. The geometry component may be determined based on various factors including the route from the routing system. The speed component may be determined using an iterative process using a plurality of constraints. The constraints may be based on the predicted trajectories of other objects detected in the vehicle's environment (e.g. the vehicle must not come too close to these other objects) as well as characteristics of the vehicle and other limits, such as a maximum allowable deceleration limit. The planning system may attempt to determine a speed profile by starting with a fastest allowable speed which may then be reduced in order to satisfy all of the constraints of the set of constraints. If the planner system is unable to find a solution, the maximum allowable deceleration limit (and/or other constraints) may be adjusted until a solution is found.

The resulting trajectory may then be used to control the vehicle. For example, a control system software module of the computing devices 110 may be configured to control movement of the vehicle, for instance by controlling braking, acceleration and steering of the vehicle, in order to follow a trajectory.

The vehicle's planning system 168 may store or access a pullover deceleration limit which may be different from the maximum allowable deceleration limit for nominal driving as discussed above. The pullover deceleration limit may be hand-tuned and selected based upon how uncomfortable different deceleration limits may be for passengers and/or tertiary persons as well as the characteristics of the vehicle. As discussed further below, when pulling over, rather than adjusting the maximum allowable deceleration limit for the purposes of the pullover, the vehicle's computing devices may simply identify another pullover location. For example, in a situation where the vehicle is driving 30 mph, the vehicle's computing devices should not choose a spot 10 meters in front of the vehicle and then brake as hard as necessary to reach it by adjusting the pullover deceleration limit as would be done with planning trajectories using the maximum allowable deceleration limit. Instead, the vehicle's computing devices may utilize an appropriate pullover deceleration limit or discomfort to choose a pullover location further away that the vehicle can reach more comfortably for any passenger or tertiary persons.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 10:
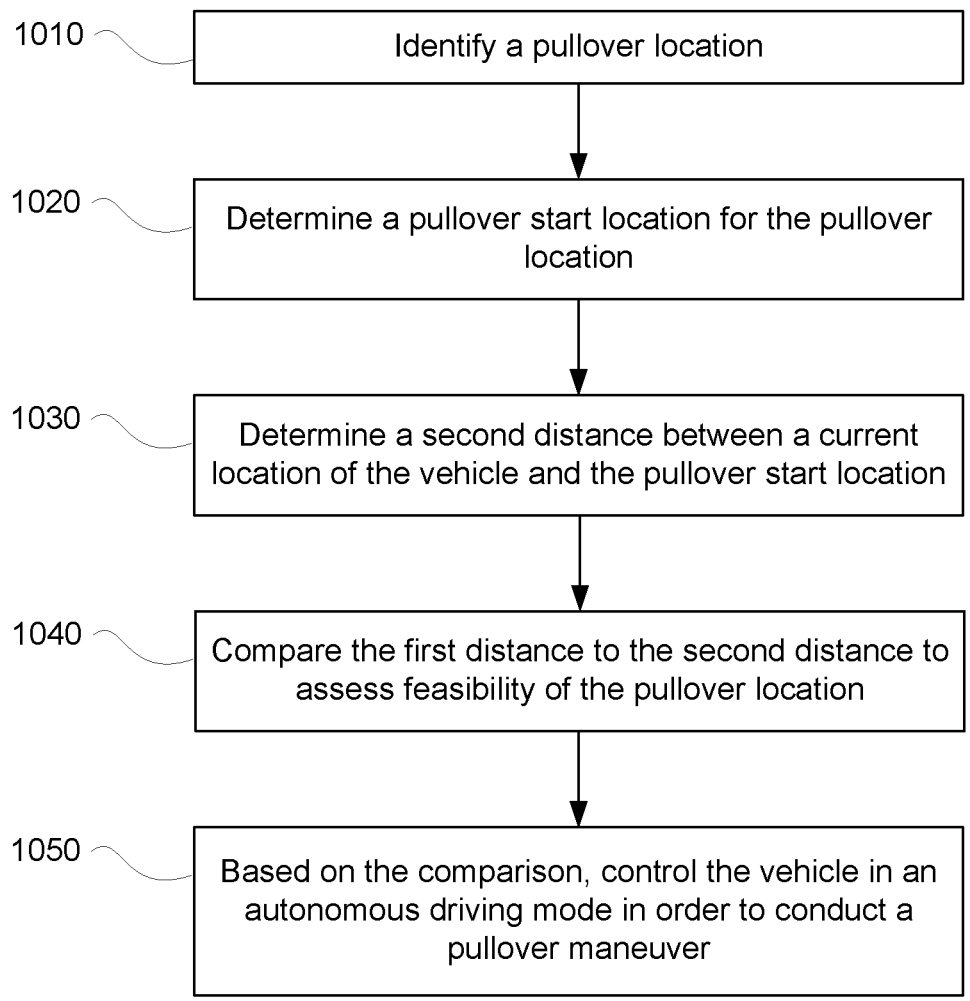
FIG. 10 is an example flow diagram in accordance with aspects of the disclosure.

FIG. 10 is an example flow diagram 1000 for conducting pullover maneuvers for autonomous vehicles, which may be performed by one or more processors of one or more computing devices, such as the processors 120 of the vehicle 100. At block 1010, a pullover location is identified. For example, as vehicle 100 approaches a destination, it may begin to identify potential pullover locations. In many cases, pullover locations may be known in advance. For example, pullover locations may be identified in the map information 200, such as the parking spaces 280-287 as discussed above, or may be detected in real time, for example, based on dimensions of the pullover location and the vehicle. For each pullover location identified (and not otherwise occupied), it may be evaluated for example, by determining which pullover location has the lowest cost. Costs may be assessed based on the distance to the destination (i.e. inconvenience to the passenger), orientation of the vehicle relative to its route to a next destination, inconvenience to other road users, anticipated lateral offset (e.g. shorter spots might lead to a reduced lateral offset), etc. However, in addition to these considerations, the vehicle's computing devices may also determine feasibility of the pullover location based on the pullover deceleration limit.

Figure 4:
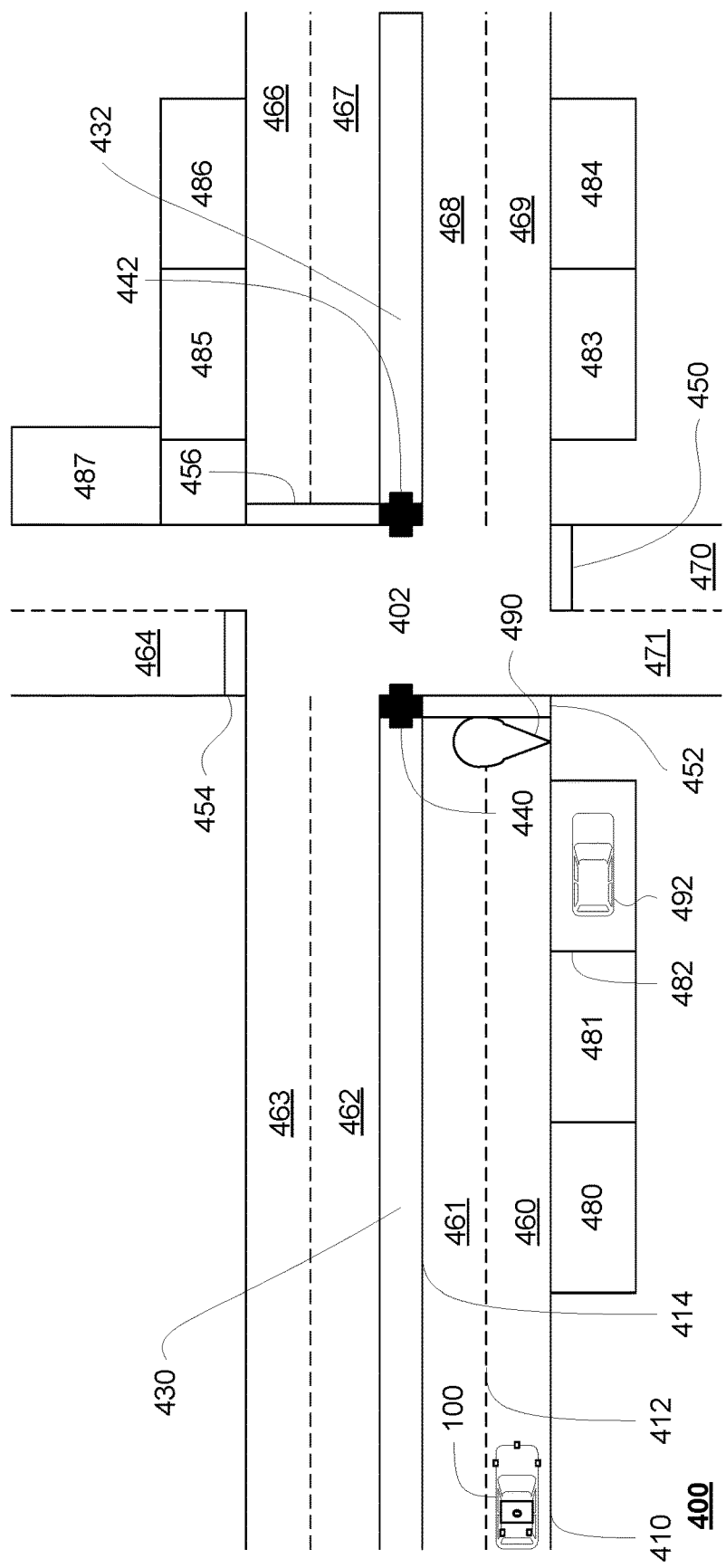
FIG. 4 is an example bird's eye view of a vehicle driving on a section of roadway in accordance with aspects of the disclosure.

FIG. 4 is an example of vehicle 100 driving through a geographic area 400 corresponding to the area of the map information 200 depicted in FIG. 2. In this example, the shape, location and other characteristics of intersection 402 correspond to the shape, location and other characteristics of intersection 202, the shape, location and other characteristics of lane markers or lane lines correspond 410, 412, 414 to the shape, location and other characteristics of lane markers or lane lines 210, 212, 214, the shape, location and other characteristics of median areas 430, 432 correspond to the shape, location and other characteristics of median areas 230, 232, the shape, location and other characteristics of traffic signals 440, 442 correspond to the shape, location and other characteristics of traffic signals 240, 242, the shape, location and other characteristics of stop lines 450, 452, 454, 456, correspond to stop lines 250, 252, 254, 256, the shape, location and other characteristics of lanes 460-471 correspond to the shape, location and other characteristics of lanes 260-271, and the shape, location and other characteristics of parking spaces 480-487 correspond to the shape, location and other characteristics of parking spaces 280-287.

In the example of FIG. 4, the vehicle 100 is approaching a destination location represented by marker 490. As noted above, this destination may be pickup location or drop off location for passengers or goods. At this point, the vehicle may be some predetermined distance from the destination location, and may begin to look for pullover locations. As noted above, the pullover locations may be identified from the map information 200 or may be detected in real time based on dimensions of the pullover location and the vehicle 100. In this regard, the computing devices 110 may identify potential pullover locations corresponding to the parking spaces 280-287 in the map information 200, here parking spaces 480-487. However, in this example, information (e.g. sensor data) generated by and received from the perception system 174 may indicate that parking space 482 is occupied by another vehicle 492. In addition, parking spaces 485-487 may not be considered as they would require additional maneuvers (e.g. a turn, a k-turn, driving around the block, etc.). In this regard, the computing device 110 may identify parking spaces 480, 481, 483, and 484 as potential pullover locations.

Returning to FIG. 10, at block 1020, a pullover start location for the pullover location is determined. For each pullover location, the computing devices 110 may determine a pullover start location at which the vehicle will need to begin to adjust its position in a lane in order to pull into the pullover location. For instance, this point may be considered a location where the vehicle will need to "nudge" or laterally shift over to the right for a pullover location on a right-hand side of a road, for example in a right-hand drive jurisdiction as depicted in the examples described herein. Alternatively, in a left-hand drive jurisdiction, this point may be considered a location where the vehicle will need to laterally shift over to the left for a pullover location on a left-hand side of a road. The location may be determined based on the difference between the lateral offsets in the vehicle's current location and the lateral offset in the planned pullover location. In other words, the lateral offset may correspond to how far to the left or right the vehicle would need to adjust itself from its current location to the pullover location. In this regard, if the vehicle were to pull out of its current lane, the lateral offset distance would be greater than if the vehicle were to double park in the lane. As such, the distance between the pullover location and the pullover start location increases as the lateral offset distance increases.

Figure 5:
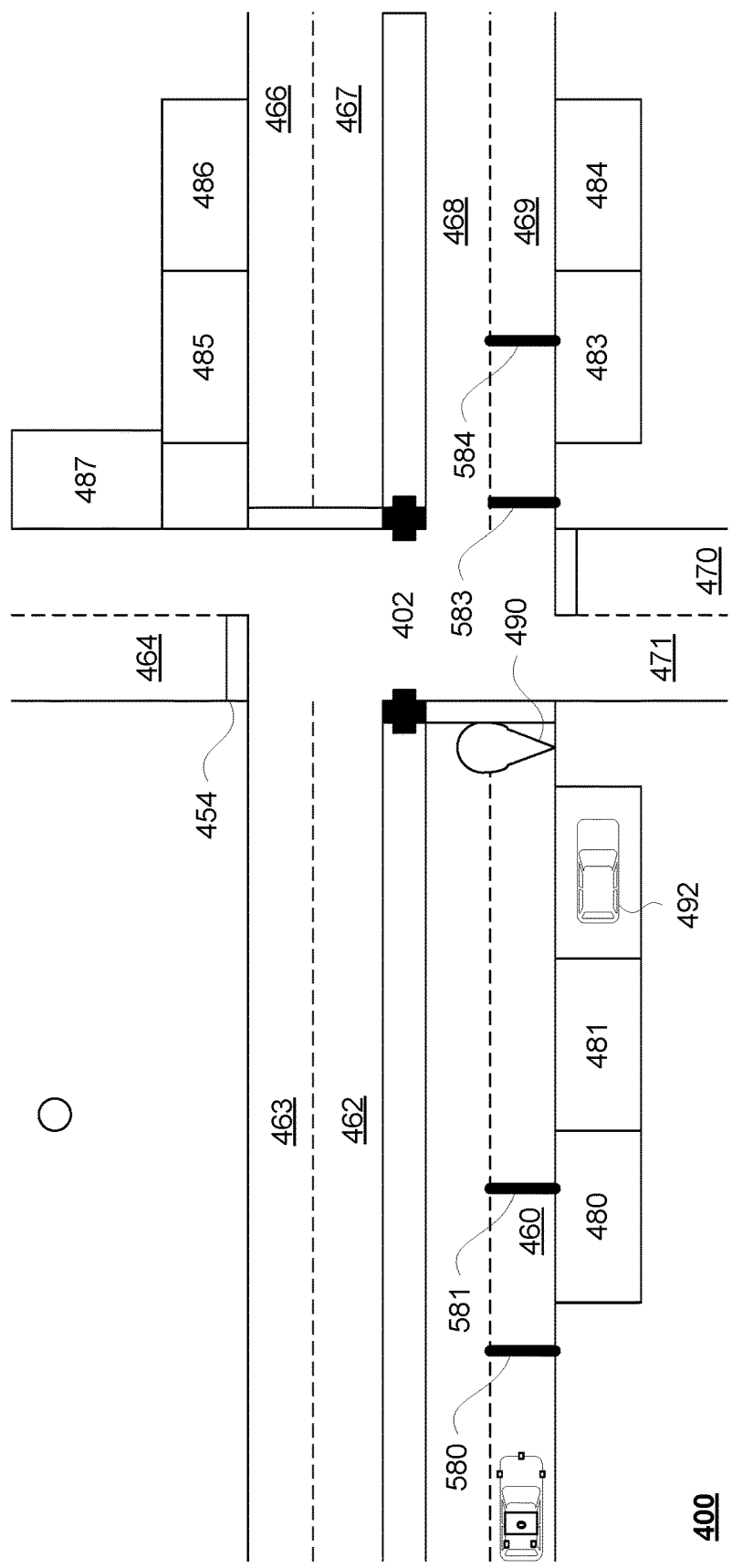
FIG. 5 is an example bird's eye view of a vehicle driving on a section of roadway with pullover start locations in accordance with aspects of the disclosure.

Turning to FIG. 5, the computing devices 110 may determine a pullover start location for each of the potential pullover locations, parking spaces 480, 481, 483, 484. In this example, line 580 represents a pullover start location for parking space 480, line 581 represents a pullover start location for parking space 481, line 583 represents a pullover start location for parking space 483, and line 584 represents a pullover start location for parking space 484. In this regard, in order to pull into parking space 480, the computing devices 110 would need to control the vehicle 100 in order to begin to laterally shift over once the vehicle passes through any of the points on the line 580, and similarly for parking spaces 481, 483, 484 and lines 581, 583, 584, respectively.

Returning to FIG. 10, at block 1030, a first distance for a vehicle to come to a complete stop within a pullover deceleration limit based on a current speed of the vehicle is determined. For instance, the computing devices 110 may then determine whether a pullover location is feasible based on the vehicle dynamics, the pullover start location, and the pullover deceleration limit. In this regard, the first distance is determined without regard to the potential pullover locations themselves.

The vehicle dynamics may include the vehicle's current speed, current deceleration (or acceleration), and current rate of deceleration (or acceleration). In addition, vehicle dynamics may also take into consideration additional factors such as actuator delays, current actuator state, controllability, road surface conditions, etc. In this regard, the vehicle dynamics may be both current and estimated. For example, the computing devices 110 may predict how quickly the vehicle 100 will achieve a certain deceleration in the future. Most deceleration values (e.g. −2 m/s$^2$ acceleration) cannot be achieved instantaneously so the process of reaching a desired deceleration and the traveled distance during that time could be estimated or predicted. As one simple example, using the vehicle's current speed, deceleration, and rate of deceleration, the vehicle's computing devices may estimate a first distance between the vehicle and a stopping location for the vehicle, or a distance required for the vehicle to come to a complete stop within the pullover deceleration limit. Again, the calculation of the first distance may take into account the aforementioned additional factors as well as estimated vehicle dynamics and therefore may be much more complicated.

Figure 6:
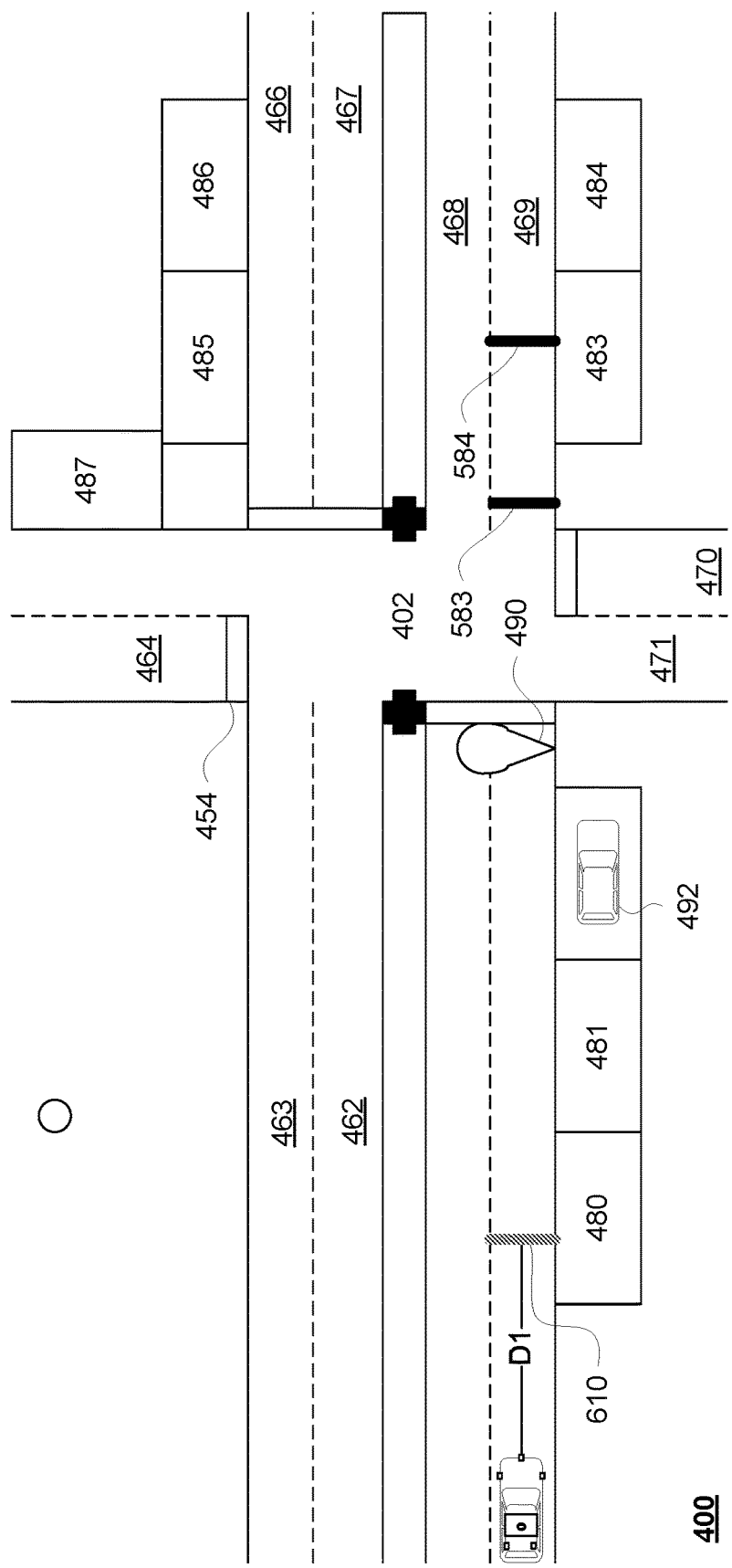
FIG. 6 is an example bird's eye view of a vehicle driving on a section of roadway and data including a first distance in accordance with aspects of the disclosure.

Turning to FIG. 6, the computing devices 110 may determine a location at which the vehicle 100 is able to come to a complete stop within a pullover deceleration limit based on the current speed of the vehicle 100. In this example, line 610 represents a stopping location determined based on the vehicle dynamics and the pullover deceleration limit. A first distance D1 may then be determined between the location represented by line 610 and the vehicle 100.

Figure 7:
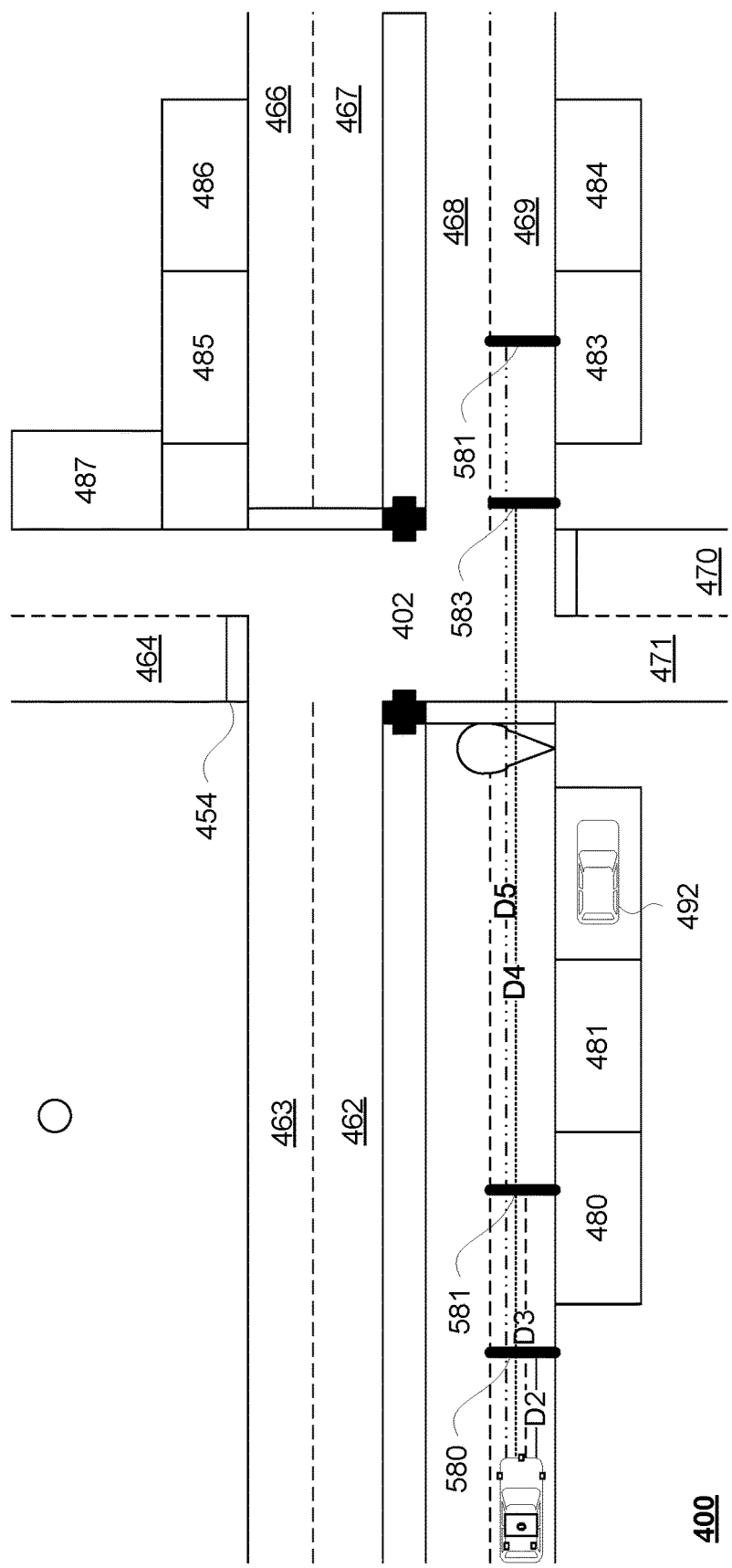
FIG. 7 is an example bird's eye view of a vehicle driving on a section of roadway and data including second distances in accordance with aspects of the disclosure.

Returning to FIG. 10, at block 1040, a second distance between a current location of the vehicle and the pullover start location is determined. For instance, the computing devices may determine a second distance between the vehicle's current location and the pullover start location. Turning to FIG. 7, the computing devices 110 may determine a second distance between the vehicle 100 and each of the pullover start locations. In this regard, distances D2, D3, D4, D5 may be determined between the vehicle and each of the pullover start locations corresponding to lines 580, 581, 583, 584, respectively.

Returning to FIG. 10, at block 1050, the first distance is compared to the second distance to assess feasibility of the pullover location. Thereafter at block 1060, the vehicle is controlled in an autonomous driving mode in order to conduct a pullover maneuver. For instance, the vehicle's computing devices may then compare the first distance with the second distance. If the first distance is less than or equal to the second distance, then the pullover location is feasible within the pullover deceleration limit. If the first distance is greater than the second distance, then the pullover location is not feasible within the pullover deceleration limit. If a pullover location is not feasible, it may be discarded. If the pullover location is feasible, it may be selected by the vehicle's computing devices and set as a destination for the vehicle. In this regard, when the vehicle reaches the pullover start location, the vehicle's computing devices may control the vehicle in order to conduct a pullover maneuver into the selected pullover location.

Returning to the examples of FIGS. 4, 5, 6 and 7, the distance D1 may be compared to each of the distances D2, D3, D4, and D5 to determine whether any of the potential pullover locations are feasible. With regard to the potential pullover location corresponding to parking space 480, because D2 is less than D1, this pullover location may be determined to be not feasible. With regard to the potential pullover location corresponding to parking space 481, because D3 is greater than D1, this pullover location may be determined to be feasible. With regard to the potential pullover location corresponding to parking space 483, because D4 is greater than D1, this pullover location may be determined to be feasible. With regard to the potential pullover location corresponding to parking space 484, because D5 is greater than D1, this pullover location may be determined to be feasible.

Figure 8A:
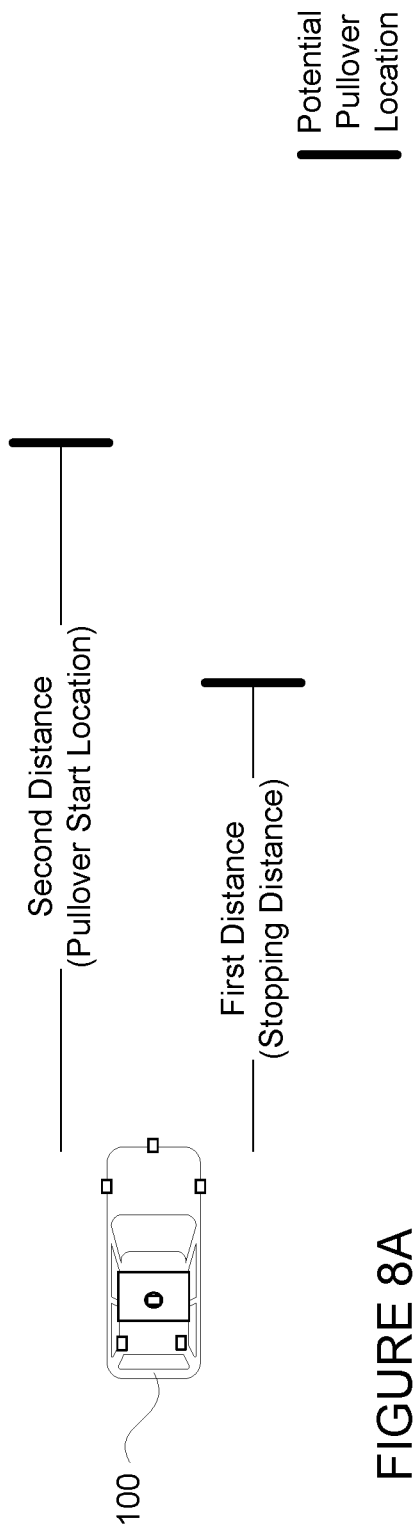
FIGS. 8A and 8B are examples of comparisons of distances in accordance with aspects of the disclosure.
Figure 8B:
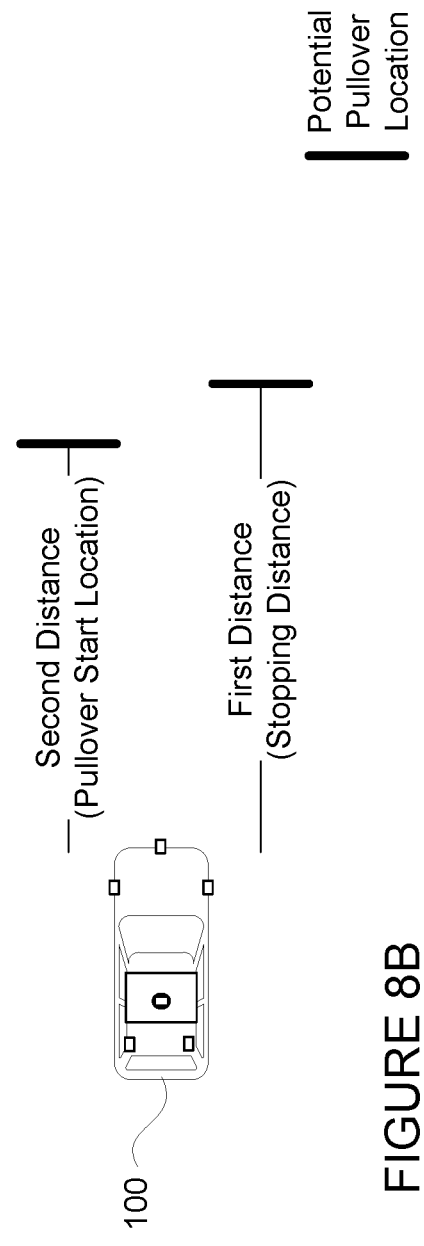

FIGS. 8A and 8B provide more detailed example comparisons. FIG. 8A depicts an example of a potential pullover location which would be determined to be feasible. In this example, the distance between vehicle 100 and the pullover start location (Second Distance) is greater than the distance between the vehicle and a stopping location of the vehicle (First Distance) determined based on the vehicle dynamics as well as a pullover deceleration limit. Also represented is the potential pullover location or rather, an ultimate location at which the vehicle would stop if the vehicle is controlled to stop in the potential pullover location.

FIG. 8B depicts an example of a potential pullover location which would be determined to be not feasible. In this example, the distance between vehicle 100 and the pullover start location (Second Distance) is less than the distance between the vehicle and a stopping location of the vehicle (First Distance) determined based on the vehicle dynamics as well as a pullover deceleration limit. Also represented is the potential pullover location or rather, an ultimate location at which the vehicle would stop if the vehicle is controlled to stop in the potential pullover location.

The computing devices 110 may constantly continue looking for the "best" pullover location using an updated current location, updated vehicle dynamics, updated sensor data, etc. This may continue, for example, until some point after the vehicle reaches a pullover start location of a selected pullover location and begins to laterally shift towards the selected pullover location. In this regard, the vehicle's computing devices may still have time to "abort" a pullover before the vehicle begins to laterally shift towards the selected pullover location. For example, this may become helpful or even necessary for any number of reasons such as if in the event a tertiary person is detected in the vicinity of a selected pullover location, if the vehicle no longer needs to pull over (e.g. a trip is cancelled), etc. After the vehicle reaches the pullover start location and begins to laterally shift, aborting may become a problem as it could lead to discomfort of a passenger who may not be able to reasonably anticipate a sudden lateral shift away from the selected pullover location. In addition, at higher speeds, such a change in the lateral movements of the vehicle may cause a sudden lateral acceleration or jerk which can be uncomfortable to a passenger of the vehicle.

As such, the computing devices 110 will continue to assess whether the selected pullover location is feasible and/or any other nearby pullover location is a better option by identifying pullover locations and evaluating them as described above. For example, using the vehicle's current speed, deceleration, and rate of deceleration, the vehicle's computing devices may estimate a third distance required for the vehicle to come to a complete stop. The vehicle's computing devices may then compare this distance with a fourth distance between the vehicle's current location and the pullover location If the third distance is less than or equal to the fourth distance, then the pullover location is feasible within the pullover deceleration limit. If the third distance is greater than the fourth distance, then the pullover location is not feasible within the pullover deceleration limit.

Figure 9A:
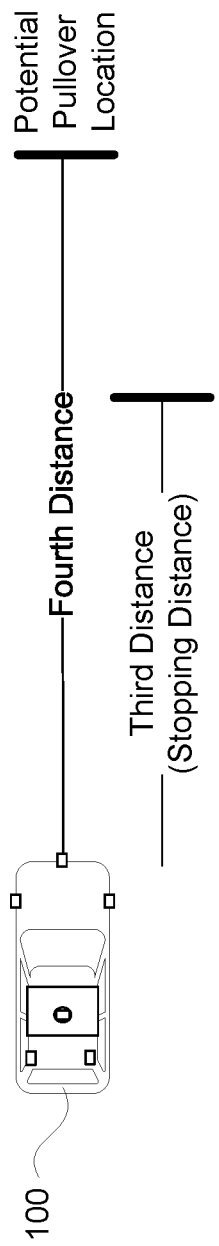
FIGS. 9A and 9B are examples of comparisons of distances in accordance with aspects of the disclosure.
Figure 9B:
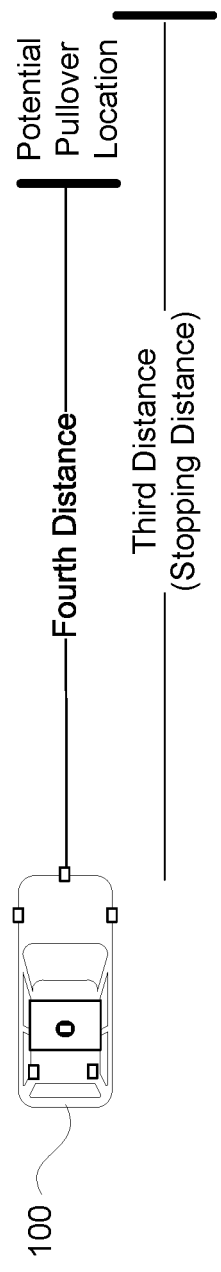

FIGS. 9A and 9B provide more detailed example comparisons. FIG. 9A depicts an example of a potential pullover location which would be determined to be feasible. In this example, the distance between vehicle 100 and potential pullover location (Fourth Distance) or rather, an ultimate location at which the vehicle would stop if the vehicle is controlled to stop in the potential pullover location, is greater than the distance between the vehicle and a stopping location of the vehicle (Third Distance) determined based on the vehicle dynamics as well as a pullover deceleration limit. Because of this, the potential pullover location in this example would be feasible.

FIG. 9B depicts an example of a potential pullover location which would be determined to be not feasible. In this example, the distance between vehicle 100 and potential pullover location (Fourth Distance) or rather, an ultimate location at which the vehicle would stop if the vehicle is controlled to stop in the potential pullover location, is less than the distance between the vehicle and a stopping location of the vehicle (Third Distance) determined based on the vehicle dynamics as well as a pullover deceleration limit. Because of this, the potential pullover location in this example would not be feasible.

Again, if a pullover location is no longer feasible, it may be discarded or the pullover maneuver may be aborted and the vehicle may continue onto a new pullover location. In this regard, if a closer pullover location becomes available, the vehicle's computing devices are still able to select that pullover location even when the vehicle's computing devices had already selected and begun a pullover maneuver for another selected pullover location.

The feasibility of a particular potential pullover location may be determined before or after the costs have been assessed for that pullover location. For example, the computing devices 110 may determine the costs for all potential pullover locations within a certain distance of the vehicle (possibly even those behind the vehicle). Thereafter the computing devices 110 may discard or disregard all of the potential pullover locations that are determined to be not feasible. Any feasible location with the lowest cost may then be selected as the pullover location for the vehicle. Alternatively, the computing devices 110 may determine whether any potential pullover locations are feasible and thereafter compute the costs of the feasible potential pullover locations. The potential pullover location with the lowest cost may then be selected as the pullover location for the vehicle. In either case, is possible that feasibility is non-consecutive as feasibility may be dependent on the right offset (or left offset) and other parameters. In other words, it could be that there is a feasible potential pullover location closer to the vehicle, a second, infeasible potential pullover location slightly farther away, and a third feasible potential pullover location even further than the second.

The features described herein may allow for selection of pullover locations which prioritize the discomfort of passengers as well as tertiary persons. In addition, in most driving situations, vehicle dynamics are determined based on real world objects, in other words, to avoid a collision with an object, a vehicle may brake as hard as necessary. However, because it is undesirable to perform uncomfortable maneuvers solely for the purpose of pulling over (assuming no other constraints) and because the vehicle's computing devices are able to simply select another pullover location, the features described herein may enable the vehicle to limit discomfort of passengers as well as tertiary persons.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of conducting pullover maneuvers for autonomous vehicles, the method comprising:
    identifying, by one or more processors, a pullover location;
    determining, by the one or more processors, a pullover start location for the pullover location;
    determining, by the one or more processors, a first distance for a vehicle to come to a complete stop based on a current speed of the vehicle and a pullover deceleration limit of the vehicle;
    determining, by the one or more processors, a second distance between a current location of the vehicle and the pullover start location;
    comparing, by the one or more processors, the first distance to the second distance to assess feasibility of the pullover location; and
    based on the comparison, controlling, by the one or more processors, the vehicle in an autonomous driving mode in order to conduct a pullover maneuver.

2. The method of claim 1, wherein the pullover start location is determined based on a pullover offset distance between an edge of a current lane of the vehicle and an edge of the pullover location.

3. The method of claim 2, wherein as the pullover offset distance increases, a distance between the pullover start location and the pullover location increases.

4. The method of claim 1, wherein the first distance is determined further based on a current deceleration of the vehicle.

5. The method of claim 1, wherein the first distance is determined further based on a current rate of deceleration of the vehicle.

6. The method of claim 1, wherein the pullover deceleration limit is a predetermined limit on deceleration of the vehicle.

7. The method of claim 1, wherein when the first distance is greater than the second distance, controlling the vehicle includes controlling the vehicle to pullover into a second pullover location different from the pullover location.

8. The method of claim 1, wherein when the first distance is less than the second distance, controlling the vehicle includes selecting the pullover location as a pullover location for the vehicle.

9. The method of claim 8, wherein selecting the pullover location includes setting the pullover location as a destination for the vehicle.

10. The method of claim 8, further comprising, after selecting the pullover location, continuing to identify pullover locations and assess feasibility of those pullover locations.

11. The method of claim 8, further comprising, after selecting the pullover location:
    controlling the vehicle beyond the pullover start location towards the selected pullover location; and
    after controlling the vehicle beyond the pullover start location:
    identifying a second pullover location,
    determining a third distance for the vehicle to come to a complete stop based on an updated current location of the vehicle, an updated current speed of the vehicle, and the pullover deceleration limit,
    determining a fourth distance between the updated current location of the vehicle and the second pullover location,
    comparing the third distance to the fourth distance to assess feasibility of the second pullover location, and
    controlling the vehicle based on the comparison of the third distance to the second distance.

12. The method of claim 11, wherein when the third distance is less than the fourth distance, controlling the vehicle based on the comparison of the third distance to the second distance includes controlling the vehicle to the second pullover location.

13. The method of claim 12, wherein controlling the vehicle to the second pullover location effectively aborts the pullover maneuver.

14. The method of claim 11, wherein when the third distance is greater than the fourth distance, controlling the vehicle based on the comparison of the third distance to the second distance includes controlling the vehicle to the selected pullover location.

15. The method of claim 11, wherein the second pullover location is closer to the updated current location of the vehicle than the selected pullover location.

16. The method of claim 1, wherein determining the first distance further comprises determining the first distance based on a current deceleration of the vehicle and a current rate of deceleration of the vehicle.

17. A system for conducting pullover maneuvers for autonomous identify a pullover location;
vehicles, the system comprising one or more processors configured to:
determine a pullover start location for the pullover location;
determine a first distance for a vehicle to come to a complete stop based on a current speed of the vehicle and a pullover deceleration limit;
determine a second distance between a current location of the vehicle and the pullover start location;
compare the first distance to the second distance to assess feasibility of the pullover location; and
based on the comparison, control the vehicle in an autonomous driving mode in order to conduct a pullover maneuver.

18. The system of claim 17, wherein the one or more processors are further configured to determine the pullover start location further based on a pullover offset distance between an edge of a current lane of the vehicle and an edge of the pullover location.

19. The system of claim 17, wherein the one or more processors are further configured to determine the first distance further based on a current deceleration of the vehicle.

20. The system of claim 17, wherein the one or more processors are further configured to, when the first distance is greater than the second distance, control the vehicle by controlling the vehicle to pullover into a second pullover location different from the pullover location.

21. The system of claim 17, wherein the one or more processors are further configured to, when the first distance is less than the second distance, control the vehicle by selecting the pullover location as a pullover location for the vehicle.

* * * * *

UNITED STATES PATENT AND TRADEMARK OFFICE
CERTIFICATE OF CORRECTION

| | |
|---|---|
| PATENT NO. | : 11,794,779 B2 |
| APPLICATION NO. | : 17/206621 |
| DATED | : October 24, 2023 |
| INVENTOR(S) | : Jakob Robert Zwiener |

It is certified that error appears in the above-identified patent and that said Letters Patent is hereby corrected as shown below:

In the Claims

Claim 17, Column 17, Lines 12 and 13:
Now reads:
"autonomous identify a pullover location; vehicles,"
Should read:
"autonomous vehicles,"

Claim 17, Column 17, Lines 14 and 15:
Now reads:
"configured to:
determine a pullover start location for the pullover loca-"
Should read:
"configured to:
identify a pullover location;
determine a pullover start location for the pullover loca-"

Signed and Sealed this
Nineteenth Day of December, 2023

Katherine Kelly Vidal
*Director of the United States Patent and Trademark Office*